United States Patent [19]

Ozawa

[11] 4,424,590
[45] Jan. 3, 1984

[54] DOCUMENT READER
[75] Inventor: Takashi Ozawa, Kanagawa, Japan
[73] Assignee: Fuji Xerox Co., Ltd., Tokyo, Japan
[21] Appl. No.: 272,236
[22] Filed: Jun. 10, 1981
[30] Foreign Application Priority Data
  Jun. 25, 1980 [JP]  Japan .................................. 55-85241
[51] Int. Cl.³ .......................... G06K 9/00; H04N 3/14
[52] U.S. Cl. ..................................... 382/68; 250/208;
                            250/578; 358/213; 358/285
[58] Field of Search .................... 382/68, 65; 358/204,
      358/212, 213, 241, 280, 285, 287, 288, 293, 294;
                            357/29, 30, 32; 250/208, 578

[56]        References Cited
        U.S. PATENT DOCUMENTS 3,801,884  4/1974  Sequin .................................. 358/213
  3,814,846  6/1974  Snow ................................... 358/213
  3,995,107 11/1976  Woywood ........................... 358/213
  4,081,843  3/1978  Okano .................................. 358/213
  4,322,752  3/1982  Bixby .................................. 358/213

Primary Examiner—Leo H. Boudreau
Attorney, Agent, or Firm—Sughrue, Mion, Zinn, Macpeak & Seas

[57]        ABSTRACT

A document reader for use in a facsimile system which generates a continuous output signal without the use of complex memory circuitry. Light-receiving devices are divided into plural ordered groups of ordered light-receiving devices. A voltage application switch is provided for each group which selectively couples first terminals each of the light-receiving devices in that group to a positive power source or ground. Common lines connect second terminals of like order ones among even number-order groups of the light-receiving devices and second terminals of like order ones of light-receiving devices among odd number-order groups. A reading switch is coupled between each common line and an output terminal. The reading switches are actuated in sequence at a constant time interval.

5 Claims, 5 Drawing Figures

DOCUMENT READER

BACKGROUND OF THE INVENTION

The present invention relates to a document reader for use in a facsimile system or the like.

Heretofore, MOS photodiode arrays, CCD devices and the like have been used in camera sensors in document readers. Since these devices are fabricated using integrated circuit techniques, the overall size of the camera sensor can be miniaturized. In reading a document using such a miniaturized camera, however, it is necessary to reduce the image of the document using an optical system. This leads to an increase in the light path length of the optical system. Thus, difficulties have been encountered in miniaturizing the document reader.

Other types of document-reading systems are known including a system in which camera sensors are fabricated with a size equal to the width of the document to be read. The sensors are brought into close contact with a document for reading. In another system, the document is read using a 1:1 optical image system such as optical fiber array or an appropriate lens array.

These conventional manuscript-reading systems will hereinafter be discussed in detail with reference to the accompanying drawings.

Referring to FIG. 1, camera sensor devices are here light-receiving devices 6-1 to 6-12 which are made of an amorphous or polycrystalline photoconductive semiconductor thin film with capacitors connected in parallel with the light-receiving devices. The camera sensor devices are divided into, for example, four groups in which light-receiving devices 6-1 to 6-12 are connected to common lines 1-1 to 1-4 at the cathode side thereof and are connected to common lines 2-1 to 2-3 at the anode side thereof forming 4×3 matrices. The common lines 1-1 to 1-4 can be selectively connected to a power source 8 or to ground through respective ones of voltage-application switches 3-1 to 3-4. The common lines 2-1 to 2-3 are connected to respective ones of switches 4-1 to 4-3.

In the above-described system, in order, for example, to read information with the light-receiving devices 6-1 to 6-3, the voltage-application switch 3-1 is connected to the power source 8 to apply a positive bias while the other groups are connected to ground through the switches 3-2 to 3-4 and the reading switches 4-1 to 4-3 are kept open. During the reading operation, electric charge generated in the light-receiving devices 6-1 to 6-3 is stored in the corresponding capacitors 5-1 to 5-3, which may be formed by the inherent capacitance of the common lines. When a sufficient amount of charge has been stored in the capacitors 5-1 to 5-3, the voltage-application switch 3-1 is switched to the ground position in order to prevent an excessive amount of electric charge from being stored and to maintain the electric charge stored in the capacitors 5-1 to 5-3. At this time, since light radiation onto the light receiving devices 6-1 to 6-3 has already terminated and the light receiving devices 6-1 to 6-3 act as capacitors, the electric charges stored in the capacitors 5-1 to 5-3 do not flow to ground. Thereafter, by closing the reading switches 4-1 to 4-3 successively, the electric charge stored in the capacitors 5-1 to 5-3 is discharged through a load resistor 7. As the charge flows, by detecting the voltage across the resistor 7, the light information detected by the light-receiving devices 6-1 to 6-4 is read out as an electric signal. By repeating the same operation as described above successively for the other light-receiving devices 6-4 to 6-12, the information received by all light-receiving devices 6-1 to 6-12 can be read out.

In this system, however, the output signal from the light-receiving devices 6-1 to 6-12 is an intermittent signal separated into groups as illustrated in FIG. 2. The reason for this is that during periods T2 between periods T1 when an output signal is being obtained from adjacent groups of light-receiving devices, the electric charge from each subsequent group of light-receiving devices must be stored in the capacitors 5-1 to 5-3.

Therefore, in a system in which document information must be transmitted as a continuous signal, as in the case of line-by-line scanning in a facsimile system, it is necessary to store the intermittent signal for an entire scanning line in a memory in order to convert the intermittent signal into a continuous signal. That is, as depicted in FIG. 3, an intermittent signal from a camera sensor device 10 is passed to a binary coding circuit 11 where it is converted into binary codes and then a signal corresponding to one scanning line of the original document is sent to a memory 13 where it is stored. After data representing an entire scanned line has been stored in the memory 13, the data for the subsequent scanning line is stored in a memory 14. At the same time, the information stored in the memory 13 is successively and continuously read out. Thereafter, by repeating the same operation as described above alternately with the memories 13 and 14, the intermittent signal is converted into a continuous signal. The foregoing operation is controlled by a clock signal from a control circuit 12 and the continuous signal is produced at an output 16.

As described above in detail, the conventional reading system suffers from the disadvantage that in transmitting signals read out by the reader in a facsimile system, it is necessary to provide a complicated circuit to convert an intermittent signal into a continuous signal.

SUMMARY OF THE INVENTION

An object of the invention is to overcome the foregoing drawbacks of the conventional systems and to provide a document reader for use in a facsimile system, for example, which provides a continuous output signal without the use of the conventional complicated circuit.

In accordance with this and other objects of the invention, there is provided a document reader including a plurality of light-receiving devices divided into a plurality of ordered groups of ordered light-receiving devices. That is, both the groups of light-receiving devices and the light-receiving devices within each group are in ordered sequences. There is also provided a plurality of voltage-application switches with one of the voltage-application switches being provided for each group of the light-receiving devices. First terminals of each of the light-receiving devices are coupled through the corresponding voltage-application switch selectively to one of a power source and ground. A plurality of common lines are provided with ones of the common lines connecting second terminals of like order ones among even number-order groups of the light-receiving devices while other ones of the common lines connect second terminals of like order ones of the light-receiving devices among odd number-order groups of the light-receiving devices. For instance, the first device in the first group of light-receiving devices is coupled through one of the common lines to the first device in the third group of light-receiving devices. Similarly, another of the common lines connects the first devices in the second and fourth groups of light-receiving devices. A reading switch is coupled between each of the common lines and an output terminal.

DESCRIPTION OF THE PREFERRED EMBODIMENTS

Figure 4:
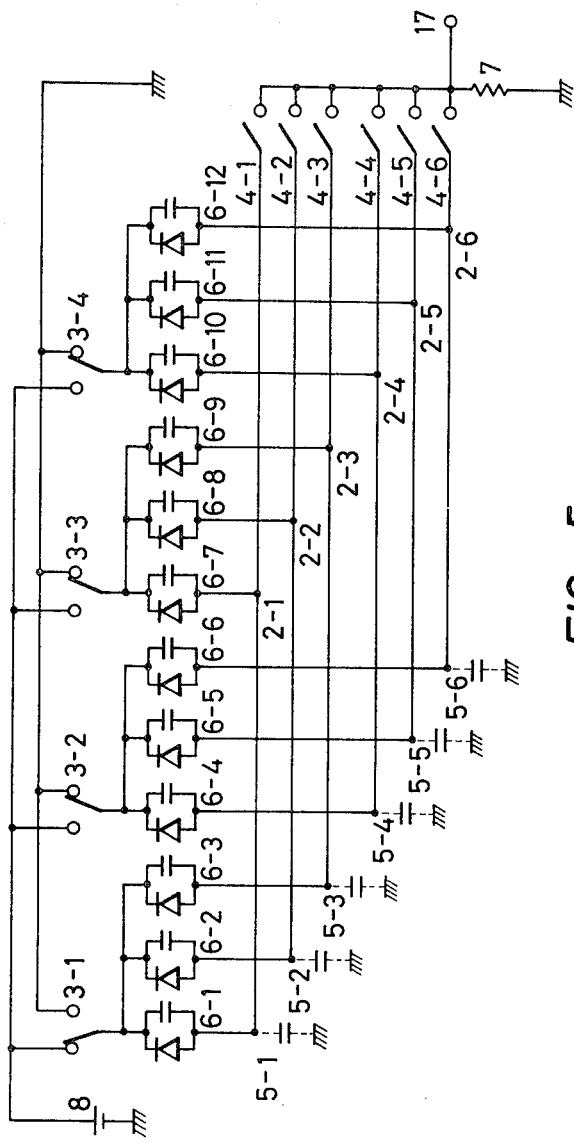
FIG. 4 is a circuit diagram of a preferred embodiment of a document reader of the invention.
Figure 5:
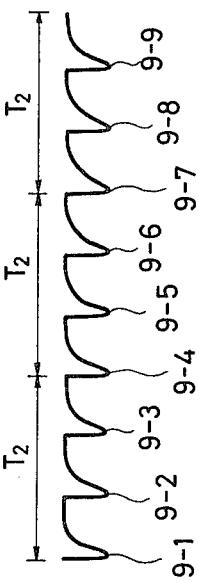
FIG. 5 is a waveform diagram illustrating the operation of the circuit shown in FIG. 4.

Hereinafter, the invention will be explained in detail with reference to the accompanying drawings wherein FIG. 4 is a circuit diagram of the apparatus of the invention and FIG. 5 is a waveform diagram illustrating the operation of the circuit of FIG. 4.

Figure 1:
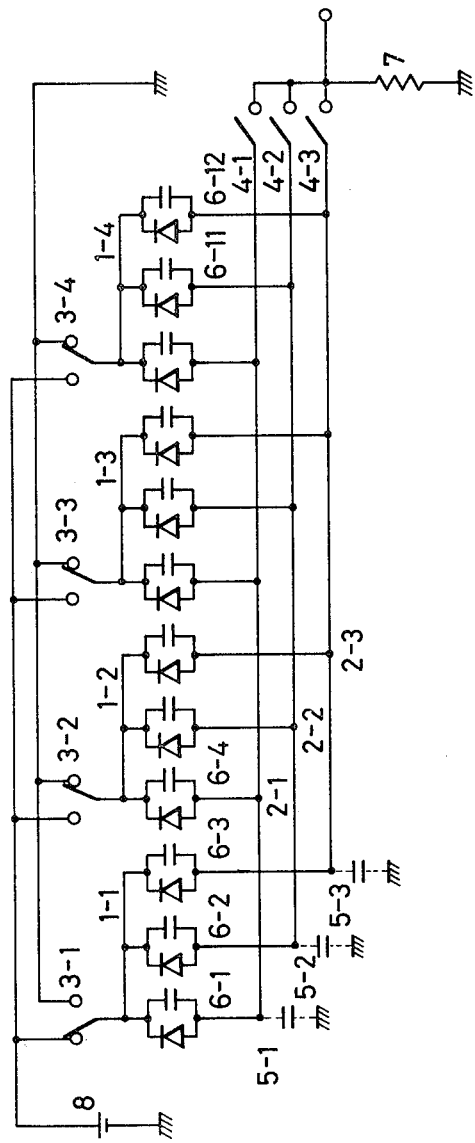
FIG. 1 is a schematic diagram of a conventional document reading system.
Figure 2:
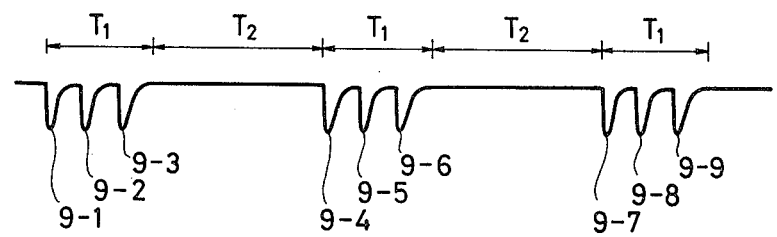
FIG. 2 is a waveform diagram showing an output of the circuit of FIG. 1.
Figure 3:
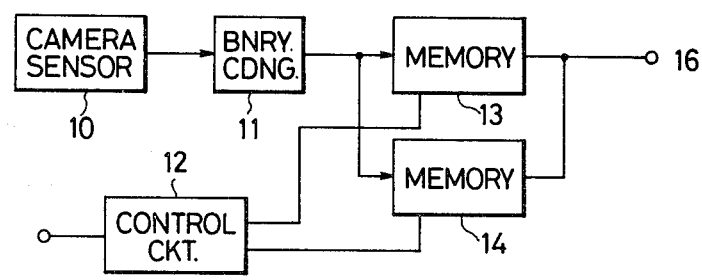
FIG. 3 is a block diagram of a conventional facsimile system.

Referring to FIG. 4, as is evident from the circuit diagram of the apparatus of the invention therein, the apparatus of the invention differs from the conventional apparatus shown in FIG. 1 in that the number of common lines 2-1, etc. is doubled.

Of light-receiving devices 6-1 to 6-12, light-receiving devices 6-1 to 6-3 and 6-7 to 6-9, belonging to odd groups 1-1 and 1-3, are connected to each other by common lines 2-1 to 2-3, respectively, whereas light-receiving devices 6-4 to 6-6 and 6-10 to 6-12, belonging to even groups 1-2 and 1-4, are connected to each other by common lines 2-4 to 2-6, respectively. To these common lines 2-1 to 2-6 are connected corresponding reading switches 4-1 to 4-6.

In reading a document, a voltage-application switch 3-1 is first switched to a power source 8 to apply a positive bias to the group 1-1 while the other groups 1-2, 1-3 and 1-4 are connected to ground by the switches 3-2, 3-3 and 3-4, respectively. Electric charge corresponding to the information detected by the light-receiving devices 6-1 to 6-3 of the group 1-1 are stored in capacitors 5-1 to 5-3, respectively. After a sufficient amount of charge has been stored in the capacitors 5-1 to 5-3, the voltage-application switch is switched to the ground terminal to hold the electric charge in the capacitors 5-1 to 5-3. At the same time, by closing the reading switches 4-1 to 4-3 in succession, the charges from the capacitors 5-1 to 5-3 are read out to an output terminal 17.

On the other hand, by switching the voltage-application switch 3-1 to the ground position and at the same time setting the subsequent voltage-application switch 3-2 to the side of the power source 8 to thereby apply a positive bias to the second group 1-2, the charges corresponding to information detected by the light-receiving devices 6-4 to 6-6 are stored in the capacitors 5-4 to 5-6. After sufficient amounts of charge has been stored in the capacitors, the voltage-application switch 3-2 is switched to the side of the ground position while at the same time the voltage-application switch 3-3 is switched to the side of the power source 8 to thereby apply a positive bias to the third group 1-3. Thus, the charges from the light-receiving devices 6-7 to 6-9 of the third group 1-3 are stored in the capacitors 5-1 to 5-3. At the same time, the reading switches 4-4 to 4-6 are closed in succession to thereby read out the charges stored in the capacitors 5-4 to 5-6 to the terminal 17.

Thereafter, the same operation as described above is repeated. For the subsequent operations, by equalizing the time taken for successively closing the reading switches 4-1 to 4-3 or 4-4 to 4-6 with the time during which the voltage-application switches 3-2 and 3-4 or 3-1 and 3-3 are coupled to the positive bias source, the output signal from the light-receiving device groups 6-1 to 6-12 is converted into a continuous signal having a constant period as depicted in FIG. 5. Thus, without the use of a complicated circuit, a continuous signal is obtained.

Assuming that the number of light-receiving devices per group is m, that there are employed n groups of camera tube devices, and that the time taken for one group to be read out is T1 and the storing time is T2, the time required to read out an entire document is $n \times (T1 + T2)$ in a conventional system, whereas with a system constructed in accordance with the invention, it is only $n \times T2$. Thus, compared with the conventional system, the system of the invention markedly shortens the time required for reading a document.

In accordance with the invention, as described above, continuous signals are produced. Therefore, applied to a facsimile system or the like, it is not necessary to use a complicated conversion circuit. Furthermore, since the time required for reading-out a document is significantly shortened, the transmission efficiency is greatly increased.

What is claimed is:

1. A document reader comprising:
   a plurality of light-receiving devices divided into a plurality of ordered groups of ordered light-receiving devices;
   a plurality of voltage-application switches one of said voltage-application switches being provided for each group of said light-receiving devices, each said voltage-application switch being coupled to a first terminal of each light-receiving device in the corresponding group of light-receiving devices to selectively connect said first terminals to one of a power source and ground;
   a plurality of common lines, ones of said common lines connecting second terminals of like order ones of said light-receiving devices among even number-order groups of said light-receiving devices and other ones of said common lines connecting second terminals of like order ones of said light-receiving devices among odd number-order groups of said light-receiving devices; and
   a plurality of reading switches, one of said reading switches being coupled between each of said common lines and an output terminal.

2. The document reader of claim 1 wherein said light-receiving devices comprise amorphous photoconductive semiconductor thin film devices having capacitors coupled in parallel thereto.

3. The document reader of claim 1 wherein said light-receiving devices comprise polycrystalline photoconductive semiconductor thin film devices having capacitors coupled in parallel thereto.

4. The document reader of claim 1 further comprising a plurality of capacitors, one of said capacitors being coupled between a corresponding one of each of said common lines and ground.

5. The document reader of any one of claims 1-4 wherein said reading switches are repeatedly closed in succession at a predetermined constant time interval.

* * * * *